2 Sheets--Sheet 1.

A. WREALSH.
Turbine Water-Wheels.

No. 135,503.  Patented Feb. 4, 1873.

Witnesses:
J. W. Jonett
Milton Cole

Inventor:
Anthony Wrealsh

2 Sheets--Sheet 2.

A. WREALSH.
Turbine Water-Wheels.

No. 135,503. Patented Feb. 4, 1873.

Witnesses:
J. W. Jonett
Milton Cole.

Inventor:
Anthony Wrealsh

UNITED STATES PATENT OFFICE.

ANTHONY WREALSH, OF SPRINGFIELD, OHIO, ASSIGNOR OF TWO-THIRDS HIS RIGHT TO EDWARD GWYN AND WILLIAM BURNS, OF SAME PLACE.

IMPROVEMENT IN TURBINE WATER-WHEELS.

Specification forming part of Letters Patent No. 135,503, dated February 4, 1873.

*To all whom it may concern:*

Be it known that I, ANTHONY WREALSH, of Springfield, in the county of Clarke and State of Ohio, have invented certain new and useful Improvements in Water-Wheels; and I do hereby declare that the following is a full, clear, and exact description thereof, reference being had to the annexed drawing making a part of this specification, in which—

Figure 1:
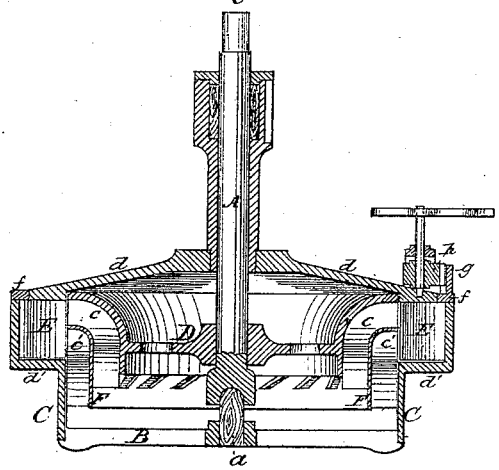
Figure 2:
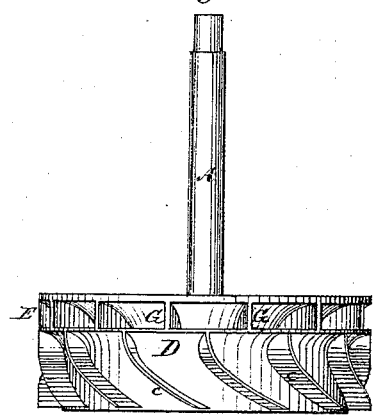
Figure 3:
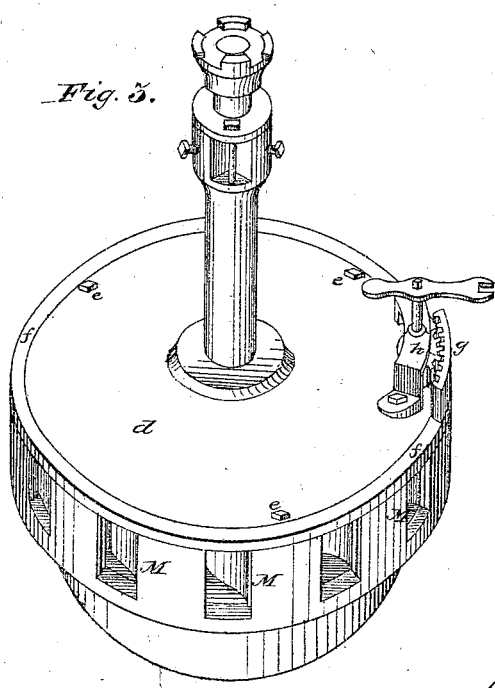
Figure 4:
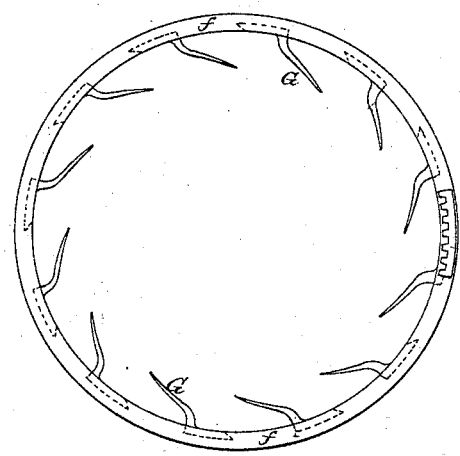
Figure 5:
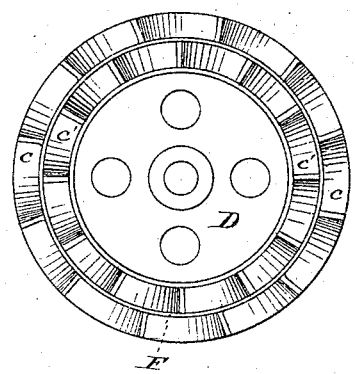
Figure 6:
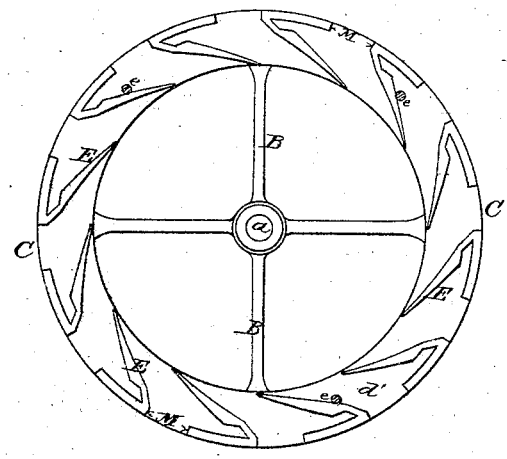

Figure 1 is a vertical section of the wheel and case. Fig. 2 is a side elevation of the wheel. Fig. 3 is a perspective view of the entire wheel and case ready to place in the forebay. Fig. 4 is a plan view of the gate-ring. Fig. 5 is a plan view of the under side of the wheel. Fig. 6 is a plan of case and chutes.

The same letters in all the figures indicate the same part.

My invention relates to that class of wheels known as the Jouval turbine, and to that particular form in which the water is introduced horizontally through openings which give a proper direction to the water, and discharge the same directly into the buckets on the periphery of the wheel, and allow of its escape outside the said periphery into the "tail-race."

To enable others skilled in the art to make and use my invention, I now proceed to describe its construction and operation.

A, Fig. 1, is the shaft, to which the wheel D is attached, with its concave foot resting on a convex wooden step, $a$, in the bridge-tree B. The tree B is attached to the cylinder C in any convenient manner. The wheel D, Fig. 5, to which the buckets $c$ and $c'$ are attached, is secured firmly to the shaft A; and the buckets $c$ and $c'$ may be cast or otherwise fastened thereon, and are so constructed that they form a double row arranged concentrically with each other, but having the entry thereto from the chutes E arranged above and below each other, as shown in Fig. 2. The upper and inner tier of buckets $c$ discharge the water at the bottom, in the same manner as $c'$, on the inside of the plate F, which is formed by the junction of buckets $c'$, but on the outside of wheel D. It will be seen that the crown-plate $d$ rests on the diagonal chutes E, and is firmly secured to the flange $d'$ on the cylinder C by the bolts $e$ $e$ $e$, and that, when so secured, it forms a guide for the gate-ring $f$, which said ring $f$ is fitted to oscillate thereon, and is operated by the rack $g$ attached thereto and the pinion $h$ attached to the crown-plate $d$. The gate-ring $f$ is constructed so as to fit the inner side of the upper part of the case or cylinder C tight enough to exclude the water when closed. On the inner side of the gate-ring $f$ are cast other diagonal stationary guides, G, to co-operate with the other diagonal guides or chutes, E, and together they guide and control the water in the desired direction to the edge of the buckets $c$ and $c'$. The upper part of the outer case or cylinder C has openings M to correspond with those of gate-ring $f$, and together they form a "register-gate," operated by the rack $g$ and pinion $h$, as before stated. The upper part of wheel D is let into a recess in the crown-plate $d$, so that it forms no obstruction to the water in entering buckets $c$ and $c'$, and prevents the waste of water over the wheel.

The means of adjusting the wheel D and shaft A are all common devices, to which I lay no claim, and therefore need no description here, being well known.

The advantage of stationary over the adjustable chutes or revolving gates, as in the "Leffel wheel," is twofold: First, the water is delivered into the bucket at the same angle (in any quantity) or position of the gate; and under no circumstances can there be between the edge of the chute and the edge of the buckets a body of water revolving with the wheel, and in which the wheel has a churning motion, thereby decreasing the per cent. of power. Second, the bolts, pins, draw-rods, and other appliances necessary to operate the revolving gates, and which, from the continuous and severe strain, soon get loosened and worn, are entirely dispensed with.

I am aware that register-gates have been heretofore constructed to revolve back and forth on the outside of the openings in the case, and also with stationary guides on the outside thereof; and I especially disclaim those devices.

What I do claim, and wish to secure by Letters Patent, is—

1. The gate-ring $f$ and the stationary guides

G attached to the inside thereof, constructed substantially as described, and for the purpose set forth.

2. The outer case or cylinder C with the stationary guides E and openings M, constructed substantially as described, and for the purpose set forth.

3. In combination with the case C and gate-ring $f$, the wheel D with its duplex series of buckets $c$ and $c'$ arranged concentrically, and having their point of discharge outside the periphery of the wheel D, substantially as described, and for the purpose set forth.

4. The combination of the gate-ring $f$ and the cylinder or case C for the purpose of forming a register-gate, when constructed substantially as described, and for the purpose set forth.

In testimony that I claim the foregoing I hereunto set my hand.

ANTHONY WREALSH.

Witnesses:
    J. W. JARRITT,
    MILTON COLE.